United States Patent
Skog et al.

(10) Patent No.: US 9,788,193 B2
(45) Date of Patent: Oct. 10, 2017

(54) METHODS AND DEVICES FOR CONTROLLING A MOBILE TERMINAL IN A RADIO ACCESS NETWORK TO TRANSITION BETWEEN A PLURALITY OF COMMUNICATION STATES

(75) Inventors: Robert Skog, Hasselby (SE);
Ann-Christine Eriksson, Grillby (SE);
Thorsten Lohmar, Aachen (DE);
Mathias Sintorn, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 85 days.

(21) Appl. No.: 13/701,672

(22) PCT Filed: May 25, 2012

(86) PCT No.: PCT/SE2012/050564
§ 371 (c)(1),
(2), (4) Date: Dec. 3, 2012

(87) PCT Pub. No.: WO2013/176591
PCT Pub. Date: Nov. 28, 2013

(65) Prior Publication Data
US 2013/0316688 A1  Nov. 28, 2013

(51) Int. Cl.
*H04M 3/00* (2006.01)
*H04W 8/22* (2009.01)
*H04W 52/02* (2009.01)
*H04W 76/04* (2009.01)

(52) U.S. Cl.
CPC ......... *H04W 8/22* (2013.01); *H04W 52/0232* (2013.01); *H04W 76/046* (2013.01); *H04W 76/048* (2013.01); *Y02B 60/50* (2013.01)

(58) Field of Classification Search
CPC .. H04W 52/0232; H04W 8/22; H04W 76/046
USPC .......................................... 370/252; 709/230
See application file for complete search history.

(56) References Cited

U.S. PATENT DOCUMENTS

| | | | | |
|---|---|---|---|---|
| 3,781,795 A * | 12/1973 | Zegers | .................. | H04L 1/0041 714/761 |
| 4,686,672 A * | 8/1987 | Namiki | ................ | H04B 7/2123 370/321 |
| 6,219,706 B1 * | 4/2001 | Fan | ..................... | H04L 63/0254 709/225 |
| 6,865,656 B2 * | 3/2005 | Turner | ................ | G06F 13/4013 709/216 |
| 2002/0061002 A1 * | 5/2002 | Nitta | .................... | H04W 76/062 370/338 |

(Continued)

OTHER PUBLICATIONS

Written Opinion of the International Searching Authority, dated Jan. 25, 2013, 5 pages.

*Primary Examiner* — Charles Shedrick
(74) *Attorney, Agent, or Firm* — Rothwell, Figg, Ernst & Manbeck, P.C.

(57) ABSTRACT

The present invention relates to methods and devices for controlling a mobile terminal in a radio access network to transition between a plurality of communication states. This object is attained in a first aspect of the present invention by a method comprising the step of acquiring (S101) an indication regarding a pattern of burst data to be transmitted to the mobile terminal. Further, the method comprises the step of controlling (S102) the mobile terminal to transition to a less resource consuming communication state of the plurality of communication states upon occurrence of a period of transmission inactivity in the burst data.

27 Claims, 8 Drawing Sheets (56) References Cited

U.S. PATENT DOCUMENTS

| | | | |
|---|---|---|---|
| 2005/0063315 A1* | 3/2005 | Chen | H04W 28/18 370/252 |
| 2005/0141511 A1* | 6/2005 | Gopal | H04W 76/046 370/395.2 |
| 2007/0162609 A1* | 7/2007 | Pope | H04L 1/0061 709/230 |
| 2007/0206561 A1* | 9/2007 | Son | H04W 72/042 370/346 |
| 2008/0008190 A1* | 1/2008 | Elstermann | H04N 7/163 370/395.41 |
| 2008/0101226 A1* | 5/2008 | Albrecht | H04L 47/10 370/230 |
| 2009/0282275 A1* | 11/2009 | Yermalayeu | G06F 1/3203 713/320 |
| 2010/0002612 A1* | 1/2010 | Hsu | H04W 52/0232 370/311 |
| 2010/0085867 A1* | 4/2010 | Ji | H04W 72/005 370/216 |
| 2010/0260095 A1* | 10/2010 | Youn | H04L 1/0029 370/315 |
| 2011/0044699 A1* | 2/2011 | Li | H04J 3/1694 398/182 |
| 2011/0269463 A1 | 11/2011 | Wang et al. | |
| 2011/0299454 A1* | 12/2011 | Krishnaswamy | H04W 52/0229 370/328 |
| 2012/0122405 A1* | 5/2012 | Gerber et al. | 455/67.11 |
| 2013/0034035 A1* | 2/2013 | Kazmi | H04W 56/0085 370/311 |
| 2013/0084809 A1* | 4/2013 | Johansson | H04W 24/08 455/67.11 |
| 2013/0308501 A1* | 11/2013 | McCormack | H04L 5/1407 370/277 |

* cited by examiner

| Offsets | Octet | | 0 | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source port |||||||||||||||| Destination port ||||||||||||||||
| 4 | 32 | Sequence number ||||||||||||||||||||||||||||||||
| 8 | 64 | Acknowledgement number (if ACK set) ||||||||||||||||||||||||||||||||
| 12 | 96 | Data offset |||| Reserved 0 0 0 ||| N S | C W R | E C E | U R G | A C K | P S H | R S T | S Y N | F I N | Window size ||||||||||||||||
| 16 | 128 | Checksum |||||||||||||||| Urgent pointer (if URG set) ||||||||||||||||
| 20 ... | 160 ... | Options ||||||||||||||||||||||||||||||||

TCP header

Fig. 8

METHODS AND DEVICES FOR CONTROLLING A MOBILE TERMINAL IN A RADIO ACCESS NETWORK TO TRANSITION BETWEEN A PLURALITY OF COMMUNICATION STATES

CROSS REFERENCE TO RELATED APPLICATION(S)

This application is a 35 U.S.C. §371 National Phase Entry Application from PCT/SE2012/050564, filed May 25, 2012, designating the United States, the disclosure of which is incorporated herein in its entirety by reference.

TECHNICAL FIELD

The invention relates to methods of, and devices for, controlling a mobile terminal in a radio access network to transition between a plurality of communication states.

BACKGROUND

In 3GPP wireless technologies, for example Global System for Mobile communications (GSM), Universal Mobile Telecommunication System (UMTS), and Long Term Evolution (LTE), the Radio Resource Control (RRC) protocol handles the control plane signalling of Layer 3 between the UEs (User Equipment) and the Radio Access Network (RAN), i.e. the network residing between the UEs and core network. In UMTS, the RAN comprises the NodeBs and Radio Network Controllers (RNCs).

The RRC protocols includes for example:
Functions for connection establishment and release,
Broadcast of system information,
Radio bearer establishment/reconfiguration and release,
RRC connection mobility procedures,
Paging notification and release,
Outer loop power control.

Figure 1:
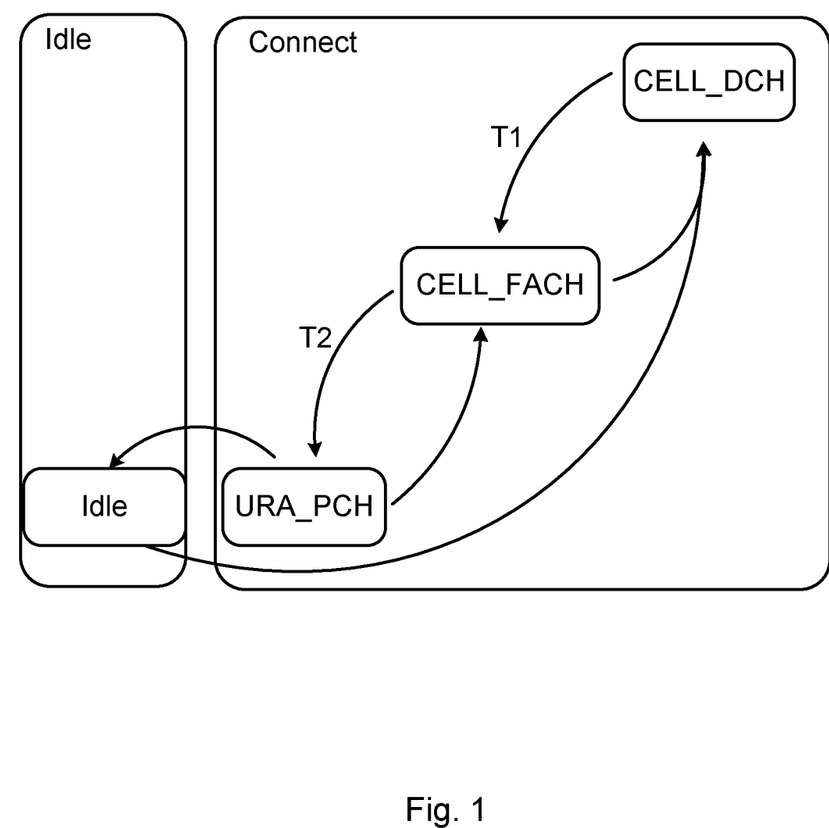
FIG. 1 exemplifies different communication states and the transitions between the states in a UMTS network.

In order to transmit/receive data to/from a mobile terminal such as a UE, the UE needs to have an established RRC connection. When in RRC connected mode, the UE may operate in different communication states. In 3GPP, these communication states are referred to as RRC states. FIG. 1 exemplifies the different communication states and the transitions between the states in a UMTS network, Inactivity for a certain time, which is determined by a timer, in a connected state generally results in transition to a less resource consuming state, while activity results in transition to a higher state in which more resources are required by the UE and the RAN. In general, communication states which provide the UE with a higher data rate require more resources, and vice versa, as is illustrated in FIG. 1. The signals used to effect transitions from one state to another are generally referred to as radio bearer re-configuration signals in UMTS, and radio bearer setup/release signals in LTE.

The configuration of RRC inactivity timers in UMTS (and in LTE) networks has great impact on resource consumption in the RAN and the UE, e.g. processing load and memory allocation in the radio nodes, UE power consumption, and radio resources. The RRC idle mode (i.e. no connection) results in the lowest power consumption of the UE. In UMTS, the states in the RRC connected mode are, in order of decreasing resource consumption, CELL_DCH (Dedicated Channel), CELL_FACH (Forward Access Channel), CELL_PCH (Cell Paging Channel) and URA_PCH (URA Paging Channel). The power consumption in the CELL_FACH is roughly 50% of that in CELL_DCH, and the PCH states use about 1-2% of the power of the CELL_DCH state. However, the transition of a UE between the different RRC states results in processing load in the radio nodes.

The transitions to less resource consuming states occur when inactivity timers trigger. Different operators have different configurations for the inactivity timers. The latency in the system also increases in the lower states; it takes some time to reach higher states. There is further a cost associated with communication state transitions, with respect to UE management undertaken by e.g. an RNC, a Base Station Controller (BSC), an eNodeB, etc., whichever of these network elements handles the transitions, implying that the inactivity timers are set such that it should be worthwhile to change the state.

In order to decrease power consumption in the UE and system resources in the radio access network, while the UE is in connected mode, there are functions like Discontinuous Reception and Transmission (DRX). The RAN determines, generally at setup, periods when the UE is permitted to turn off its transmitter or receiver, or both, in defined intervals when there is no data transmission. For example in a UMTS network, by allowing the UE to stay inactive in CELL_DCH state for longer time periods, the UE can restart transmission after a period of inactivity with a much shorter delay than would be necessary when switching state from CELL_FACH or URA_PCH or re-establishment of a new connection. This will also facilitate reduction of the number of state transitions between CELL_FACH, CELL_DCH and Idle.

Discontinuous Reception is also available in LTE networks where the period in the connected state normally is longer than in UMTS networks. In LTE there are two different modes of DRX, short and long DRX mode.

SUMMARY

An object of the present invention is to solve, or at least mitigate these problems in the art and provide an improved method and device for controlling communication states of a mobile terminal in a radio access network to transition between a plurality of communication states.

This object is attained in a first aspect of the present invention by a method of controlling a mobile terminal in a radio access network to transition between a plurality of communication states. The method comprises the step of acquiring an indication regarding a pattern of burst data to be transmitted to the mobile terminal. Further, the method comprises the step of controlling the mobile terminal to transition to a less resource consuming communication state of the plurality of communication states upon occurrence of a period of transmission inactivity in the burst data.

This object is attained in a second aspect of the present invention by a method of controlling a mobile terminal in a radio access network to transition between a plurality of communication states. The method comprises the steps of receiving burst data and controlling the mobile terminal to transition to a less resource consuming communication state of the plurality of communication states in response to an indication that a burst of the burst data terminates.

This object is attained in a third aspect of the present invention by a method of controlling a mobile terminal in a radio access network to transition between a plurality of communication states. The method comprises the steps of receiving non-burst data, converting the non-burst data into burst data, and transmitting the burst data along with an indication that a burst of the burst data terminates, wherein the mobile terminal is controlled to transition to a less resource consuming communication state of the plurality of communication states in response to said indication. The conversion of non-burst data to burst-data could e.g. depend on the bitrate of the received non-burst data; different bitrates of received non-burst data will generally result in different lengths of the created bursts.

This object is attained in a fourth aspect of the present invention by a method of controlling a mobile terminal in a radio access network to transition between a plurality of communication states. The method comprises the steps of receiving non-burst data, converting the non-burst data into burst data to be transmitted to the mobile terminal, and controlling the mobile terminal to transition to a less resource consuming communication state of the plurality of communication states in response to an indication that a burst of the burst data terminates.

Further, this object is attained by a device for controlling a mobile terminal in a radio access network to transition between a plurality of communication states according to the respective aspect of the present invention. The device is a radio node which may be embodied in the form of e.g. an RNC, a Radio Base Station (RBS) such as an eNodeB or a NodeB, a BSC, etc. The device may even be embodied in the form of a processing unit implemented in the actual mobile terminal itself; hence, the mobile terminal itself takes care of transitions between communication state.

These aspects of the present invention advantageously facilitate control of a mobile terminal in a radio access network (RAN) to transition between a plurality of communication states such that the time the mobile terminal remains in a more resource consuming communication state may be reduced. This is achieved by controlling the mobile terminal to transition to a less resource consuming state directly or shortly after a burst has terminated, rather than controlling the mobile terminal to transition to a less resource consuming state in response to an inactivity timer being triggered. In this way, the resource consumption of the mobile terminal (as well as the network element controlling the mobile terminal) may be reduced. The mobile terminal may, e.g., be a UE such, as a mobile phone, a personal digital assistant (PDA), a smart phone, a tablet, a laptop, etc., or even a small base station communicating within the respective cell. Burst data implies a data transmission being interrupted at intervals. Thus, burst data comprises a sequence of bursts, where consecutive bursts are separated by a period of inactivity.

In the first aspect of the present invention, by having e.g. an RNC, an eNodeB or a BSC (i.e. the network element controlling communication state transitions in the RAN) acquire an indication regarding a pattern of burst data, it is possible to efficiently control communication state transitions of the mobile terminal. The network element is in the following exemplified in the form of an RNC. It should be noted that the RNC may acquire the indication regarding a pattern of burst data either by receiving or requesting the indication. As an example, the indication of the pattern may comprise timing information such that an RNC knows in advance when a period of inactivity in the burst data is to occur, i.e. a period starting from the termination of a first burst and ending when a subsequent burst is received. Advantageously, the RNC thus has the possibility to effect a communication state transition of the mobile terminal instantly at the moment in time when the period of inactivity occurs, or shortly after, given that the period of inactivity is sufficiently long, i.e. the period between two bursts is considered long enough, such that a transition to a less resource consuming state is worthwhile. Hence, by instantly effecting mobile terminal transition from for instance CELL_DCH to CELL_FACH when a period of inactivity occurs, the mobile terminal does not remain in the higher resource consuming CELL_DCH communication state longer than necessary and the resource consumption of the mobile terminal as well as the RNC is reduced. In the first aspect of the present invention, the indication regarding the pattern of the burst data could be received before the actual burst data is received. Alternatively, the indication is received along with the burst data which the mobile terminal is to receive. It is further envisaged that the mobile terminal itself may acquire an indication regarding a pattern of the burst data, and subsequently itself effect communication state transitions.

In the second aspect of the present invention, the RNC receives burst data and controls the mobile terminal to transition to a less resource consuming communication state of the plurality of communication states in response to an indication that a burst of the burst data terminates. Again, the RNC is made aware of the point in time when a period of inactivity occurs, and if the period of inactivity is long enough from a state management perspective, the mobile terminal is controlled to transition to a less resource consuming state. Hence, in analogy with the first aspect of the present invention, by instantly effecting mobile terminal transition from e.g. CELL_DCH to CELL_FACH when a period of inactivity occurs, the mobile terminal does not remain in the higher resource consuming CELL_DCH communication state longer than necessary and the resource consumption of the mobile terminal as well as the RNC is reduced. Alternatively, the mobile terminal itself receives burst data and controls its communication state in response to an indication that a burst of the burst data terminates.

In the third aspect of the present invention, a network device such as e.g. an HTTP proxy or HTTP server receives non-burst data and converts the non-burst data into burst data, The non-burst data may be embodied in the form of a continuous data stream delivered by a digital content provider, e.g., a media server, Thereafter, the burst data is transmitted along with an indication that a burst of the burst data terminates, wherein the mobile terminal is controlled to transition to a less resource consuming communication state in response to the indication. Thus, in case non-burst data stream is received, it is necessary to convert the data stream into burst data before the burst data is forwarded to the RNC. This is advantageously undertaken by an HTTP server or an HTTP proxy. As in the previous aspects of the present invention, the RNC is made aware of the point in time when a period of inactivity occurs, and the mobile terminal is controlled to transition to a less resource consuming state. As a result, the RNC is capable of instantly effecting mobile terminal state transitions to enable mobile terminal (and RNC) resource-savings.

The indication that a burst of the burst data terminates may be provided for each burst of the burst data.

In an embodiment of the present invention, the indication that a burst of the burst data terminates comprises an End-of-Burst (EOB) signal or marker. Such an EOB indication could be inserted in burst data by the HTTP server or HTTP proxy and detected by the RNC, or even transmitted as a separate signal.

In a further embodiment of the present invention, the indication that a burst of the burst data terminates comprises a Transmission Control Protocol (TCP) session termination signal. This session terminal information could be included in a TCP header (or a GPRS Tunnelling Protocol (GTP) header), or transmitted as a separate signal or message.

In yet a further embodiment of the present invention, the indication that a burst of the burst data terminates comprises a Start-of-Burst (SOB) indication and an indication of size of the burst. In this embodiment, since the start of a burst and the burst size is known, it is possible to determine when the burst terminates.

In another embodiment of the present invention, the RNC acquires an indication of a silent time between consecutive bursts of the burst data, wherein a particular communication state to which the mobile terminal is controlled to transition is determined on the basis of said silent time between consecutive bursts. This is advantageous since the RNC can determine how long the period of inactivity is going to last and thus determine whether a communication state change is to be effected or not. The RNC can acquire the indication of silent time between consecutive bursts e.g. by actively requesting the indication from a device such as an HTTP server, or by receiving the indication without having requested the indication. Alternatively, the RNC can itself create the indication from the data it receives. Further, the RNC could request a particular silent time between consecutive bursts, wherein the burst data transmitter (e.g. the HTTP server) will transmit burst data with the requested silent time between bursts.

In yet another embodiment of the present invention, the mobile terminal is controlled to remain in its current communication state if the silent time between consecutive bursts is below a threshold value. This is advantageous, since if the silent time is relatively short (i.e. below the threshold value), the mobile terminal remains in the current state since the cost of transitioning to a new, less resource consuming communication state may be higher than the cost of remaining for a short period of time in the current, higher resource consuming, state.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

As previously has been discussed, FIG. 1 exemplifies the different communication states, RRC states, and the transitions between these states in a UMTS network, where a UE transits between three different states in connected mode; CELL_DCH, CELL_FACH and URA_PCH, and an Idle state in idle mode. Inactivity for a certain time, which is determined by a timer, in a connected state generally results in transition to a lower, less resource consuming, state, while activity results in transition to a higher state in which greater resources are assigned to the UE. With reference to FIG. 1, this is illustrated by means of inactivity timer T1 which is set to 2 seconds, i.e. if there is no activity for 2 s when the mobile terminal is in state CELL_DCH, it will be moved to state CELL_FACH, and inactivity timer T2 which is set to 10 seconds, i.e. if there is no activity for 10 s when the mobile terminal is in state CELL_FACH, it will be moved to state URA_PCH. As is illustrated in FIG. 1, the higher the state, the more resources are assigned to the mobile terminal (and the device controlling the mobile terminal, e.g. an RNC). Consequently, the higher the state, the higher the resource consumption, e.g., UE battery power and radio resources, in the RAN.

With further reference to FIG. 1, even though it is not shown in the figure, it should be noted that transitions to the previously mentioned DRX communication states are possible. In UMTS, for reducing power consumption, the mobile terminal is in idle mode not required to continuously listen to the information provided by the network; the mobile terminal is set in the DRX state, thereby increasing battery lifetime. In LTE, DRX can be used even in connected mode instead of transitioning to CELL_FACH or URA_PCH. Further, in LTE, the DRX cycles are provided for the mobile terminal; long and short DRX. The long DRX cycle is used during the inactivity periods of the mobile terminal, when the terminal only has to check control channels and no resources are assigned. When data activity is detected, a transition to the short DRX cycle is triggered, thus increasing the responsiveness and connectivity of the mobile terminal.

Figure 2:
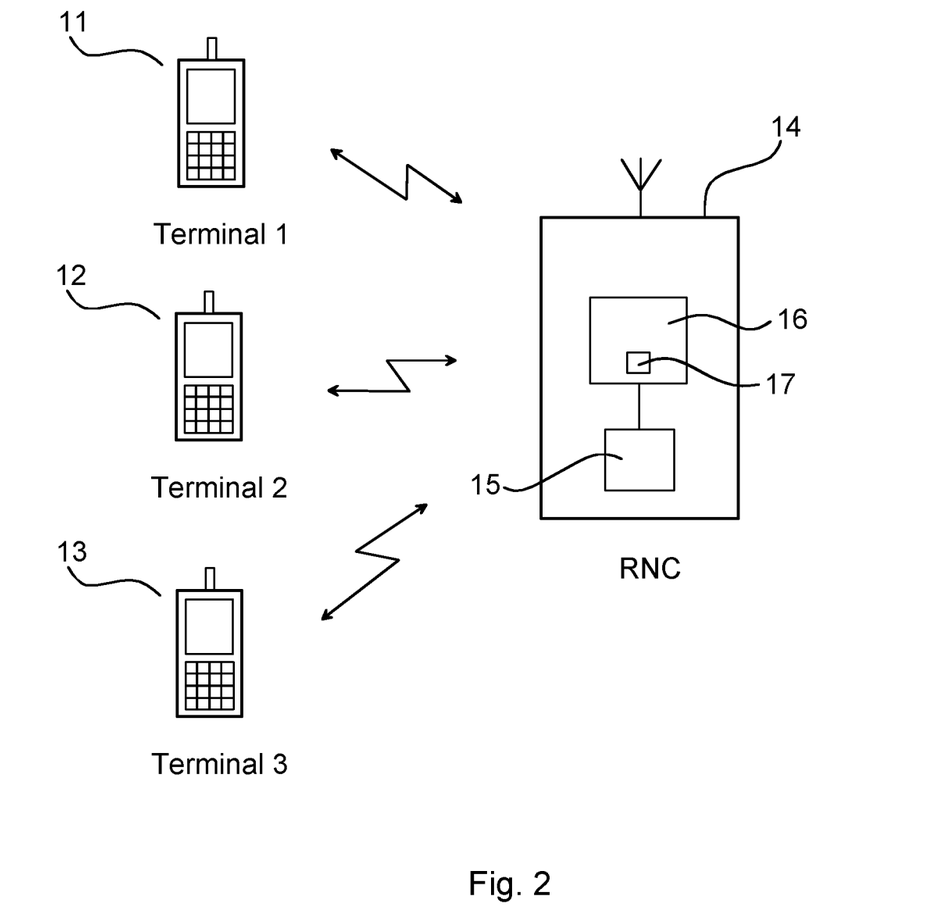
FIG. 2 illustrates a network of terminals communicating with a device according to an embodiment of the present invention.
Figure 3A:
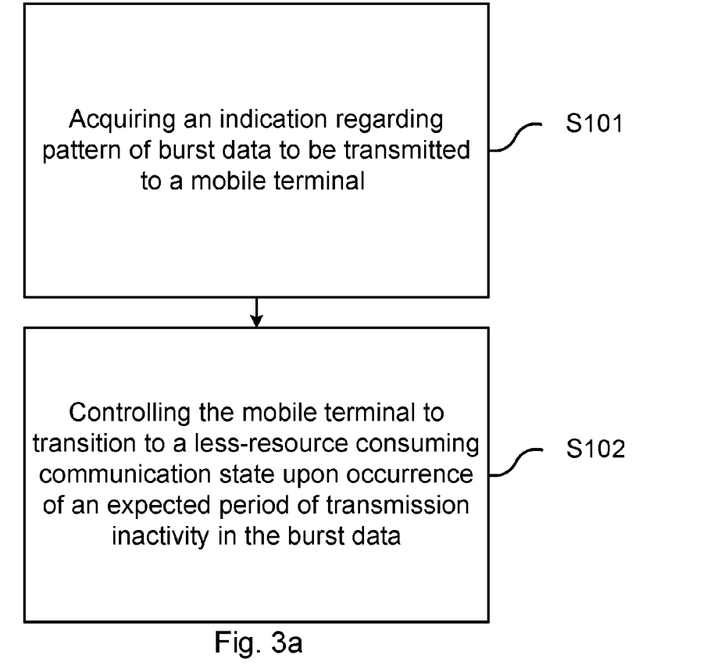
FIG. 3a shows a flow chart illustrating the method of controlling communication state of a mobile terminal according to an embodiment of the present invention.

FIG. 2 illustrates a network of mobile terminals 11, 12, 13 communicating with a device 14 according to embodiments of the present invention, which device may e.g. be an eNodeB, an RNC, a BSC, etc. The controlling of one or more of the mobile terminals 11, 12, 13 to transition between a plurality of communication states, which is undertaken in different embodiments of the method of the present invention, is managed by the RNC 14. In practice, the controlling is performed by a processing unit 15 embodied in the form of one or more microprocessors arranged to execute a computer program 17 downloaded to a suitable storage medium 16 associated with the microprocessor, such as a Random Access Memory (RAM), a Flash memory or a hard disk drive. The processing unit 15 is arranged to at least partly carry out the method according to embodiments of the present invention when the appropriate computer program 17 comprising computer-executable instructions is downloaded to the storage medium 16 and executed by the processing unit 15. The storage medium 16 may also be a computer program product comprising the computer program 17. Alternatively, the computer program 17 may be transferred to the storage medium 16 by means of a suitable computer program product, such as a floppy disk or a memory stick. As a further alternative, the computer program 17 may be downloaded to the storage medium 16 over a network. The processing unit 15 may alternatively be embodied in the form of an application specific integrated circuit (ASIC), a field-programmable gate array (FPGA), a complex programmable logic device (CPLD), etc. FIG. 3a shows a flow chart illustrating the method of controlling a mobile terminal in a radio access network to transition between a plurality of communication states according to an embodiment of the present invention. In a first step, S101, the processing unit 15 of the RNC 14 acquires an indication regarding a pattern of burst data to be transmitted to any one of the mobile terminals 11, 12, 13. Thus, the processing unit acquires an indication of timing of a sequence of bursts, which indication of timing e.g. may comprise length of subsequent bursts, length of periods of inactivity between the bursts, information relating to end-of-burst or start-of-burst, etc. This indication may be created by the RNC itself on the basis of the burst data to be distributed to one or more of the mobile terminal. Alternatively, the RNC 14 receives non-burst data, converts the received data to burst data and creates the indication on the basis of the burst data. In yet another alternative, the RNC 14 receives or requests the indication from another device such as e.g. a proxy server (not shown in FIG. 2), which delivers the burst data to the RNC 14. Then, in step S102, the processing unit 15 of the RNC 14 controls any one of the mobile terminals 11, 12, 13 to transition from a current communication state to another communication state in response to the indicated data transmission pattern. The mobile terminal is thus controlled to transition to a less resource consuming communication state of the plurality of communication states upon occurrence of a period of transmission inactivity in the burst data.

Figure 3B:
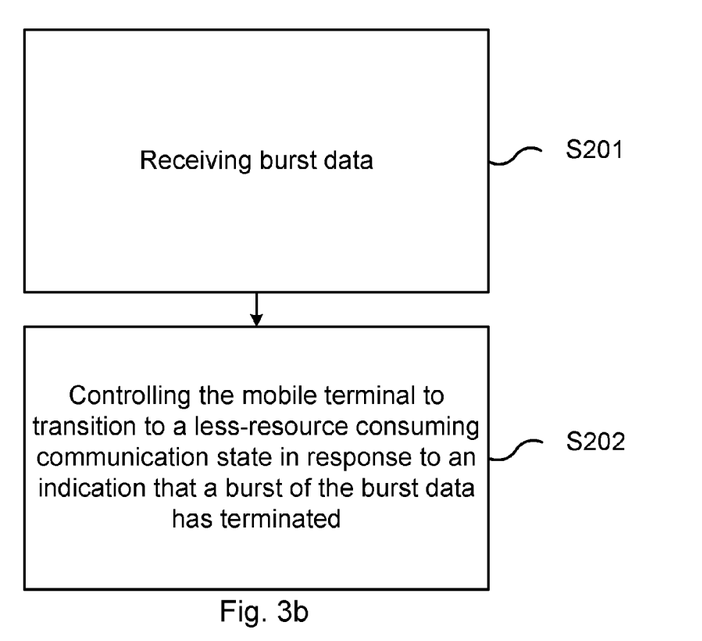
FIG. 3b shows a flow chart illustrating the method of controlling communication state of a mobile terminal according to a further embodiment of the present invention.

FIG. 3b shows a flow chart illustrating the method of controlling a mobile terminal in a radio access network to transition between a plurality of communication states according to a further embodiment of the present invention. In a first step, S201, the processing unit 15 of the RNC 14 receives burst data to be transmitted to any one of the mobile terminals 11, 12, 13. Then, in step S202, the processing unit 15 of the RNC 14 controls any one of the mobile terminals 11, 12, 13 to transition to a less resource consuming communication state of the plurality of communication states in response to an indication that a burst of the burst data terminates. This indication may be created by the RNC 14 itself on the basis of the burst data to be distributed to one or more of the mobile terminal. Alternatively, the RNC 14 receives or requests the indication from another device such as e.g. a proxy server (not shown in FIG. 2), which delivers the burst data to the RNC 14.

Figure 3C:
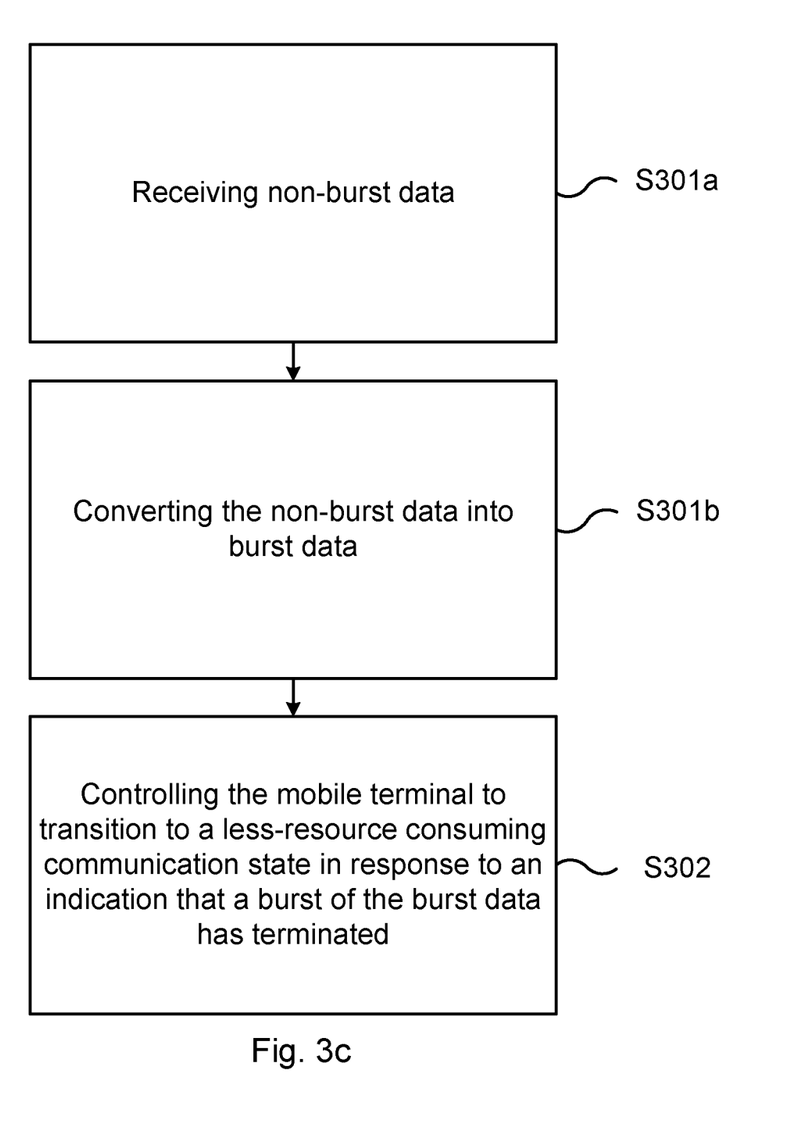
FIG. 3c shows a flow chart illustrating the method of controlling communication state of a mobile terminal according to still a further embodiment of the present invention.

FIG. 3c shows a flow chart illustrating the method of controlling a mobile terminal in a radio access network to transition between a plurality of communication states according to a further embodiment of the present invention. In a first step, S301a, the processing unit 15 of the RNC 14 receives non-burst data to be transmitted to any one of the mobile terminals 11, 12, 13. Thereafter, in a second step S301b, the processing unit 15 converts the non-burst data into burst data to be transmitted to the mobile terminals. Then, in step S302, the processing unit 15 of the RNC 14 controls any one of the mobile terminals 11, 12, 13 to transition to a less resource consuming communication state of the plurality of communication state in response to an indication that a burst of the burst data terminates. In this particular embodiment, since the RNC 14 receives non-burst data and converts it to burst data, the RNC will itself create the indication on the basis of the burst data transmission pattern.

Figure 4:
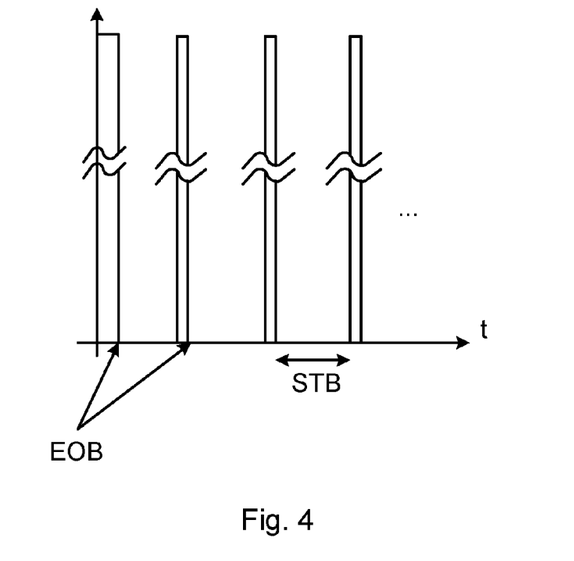
FIG. 4 illustrates burst data including indications relating to end-of-burst and silent time between bursts.

FIG. 4 illustrates an indication that a burst terminates according to an embodiment. When the RNC 14 or another device, such as an HTTP server or HTTP proxy (which will be described below), receives burst data as illustrated in FIG. 4 or non-burst data which is converted into burst data as illustrated in FIG. 4, the termination of each burst must be indicated to a mobile terminal 11, 12, 13 for which the burst data is intended, such that the mobile terminal can switch to a less resource consuming communication state of the plurality of communication states. This may be indicated by means of an end-of-burst (EOB) signal, such that the mobile terminal 11, 12, 13 does not have to wait for an inactivity timer to expire as is the case in the art. According to a further embodiment of the present invention, a silent time between bursts (STB) is further indicated to the mobile terminal, such that it can be determined to which communication state the mobile terminal should transit; a longer time period between bursts may indicate that the mobile terminal 11, 12, 13 even should transit to idle mode, whereas a short time period may indicate that transition is to be undertaken from e.g. should transit to a CELL_FACH from CELL_DCH.

Figure 5:
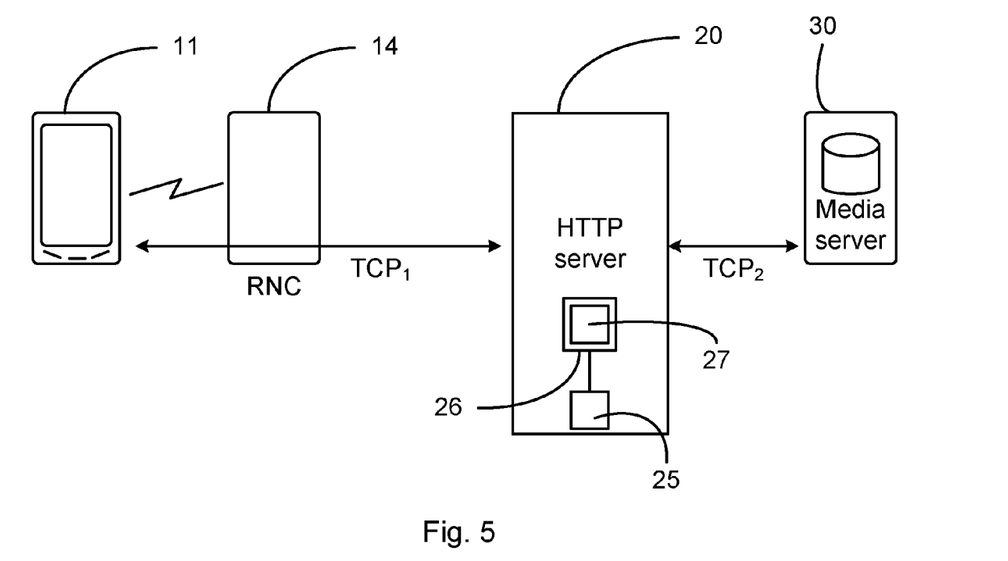
FIG. 5 illustrates a mobile terminal and an RNC communicating with a device according to an embodiment of the present invention.

FIG. 5 shows another embodiment of the invention where the RNC 14 communicates with a device such as an HTTP proxy or HTTP server 20, which in turn may communicate with a media server 30 from which the HTTP server receives data to be distributed in a RAN. The media server 30 may store and distribute digital content in the form of e.g. video and audio files. In this particular exemplifying embodiment, a first TCP session (TCP 1) is set-up between the HTTP server 20 and the mobile terminal 11, while a second TCP session (TCP 2) is set-up between the HTTP server 20 and the media server 30. As in the case of the RNC, for performing the method according to an exemplifying embodiment of the present invention, the HTTP server 20 typically comprises a processing unit 25 arranged to execute a computer program 27 stored in a memory 26. The TCP connection is setup between the HTTP server 20 and the mobile terminal 11, via the RNC 14, and data transmitted from the HTTP server to the mobile terminal transits via the RNC 14.

Figure 6:
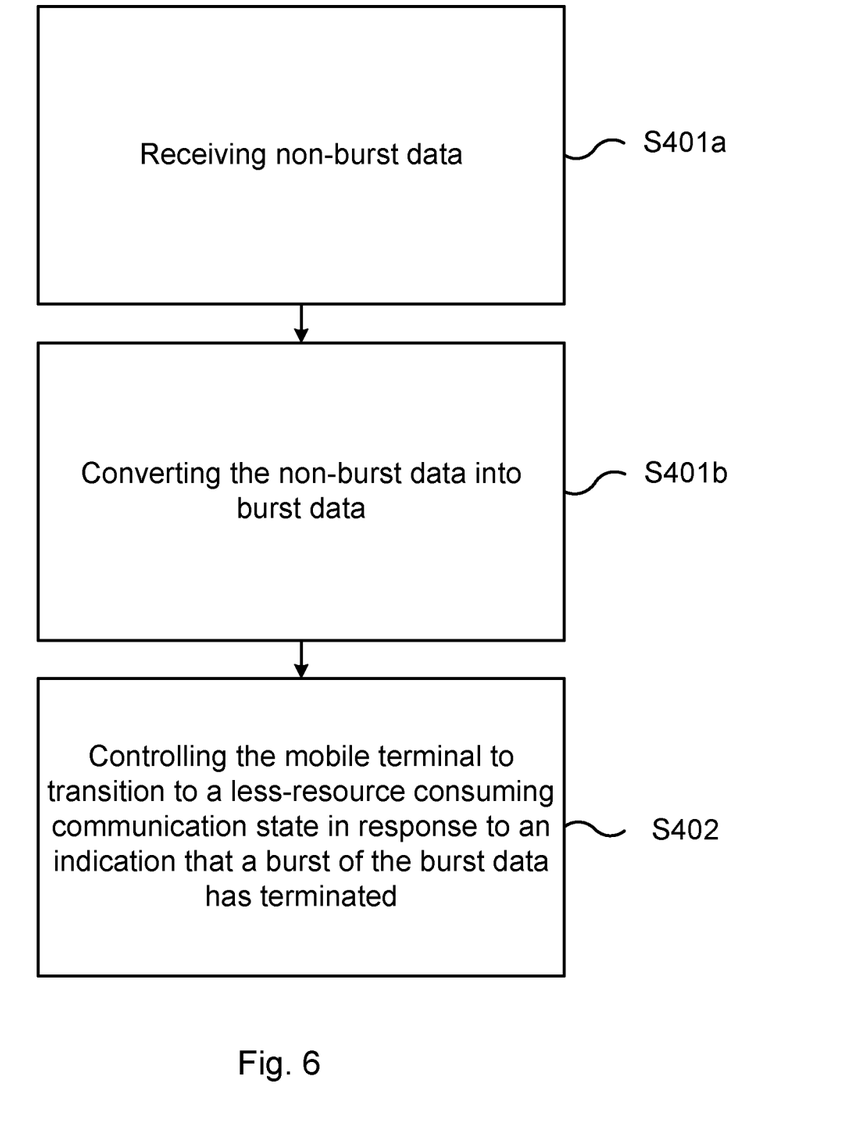
FIG. 6 shows a flow chart illustrating the method of controlling communication state of a mobile terminal according to an embodiment of the present invention.

FIG. 6 shows a flow chart illustrating the method of controlling a mobile terminal in a radio access network to transition to a communication state out of a plurality of communication states according to an embodiment of the present invention. In a first step, S401a, the processing unit 25 of the HTTP server 20 receives non-burst data to be transmitted to the mobile terminal 11. Thereafter, in a second step S401b, the processing unit 25 converts the non-burst data into burst data to be transmitted to the mobile terminal.

Then, in step S402, the processing unit 25 of the HTTP server 20 transmits the burst data along with an indication that a burst of the burst data terminates, wherein the mobile terminal is controlled to transition to a less resource consuming communication state of the plurality of communication states in response to the indication. As in the case of the embodiment described with reference to FIG. 4, the HTTP server 20 can utilize EOB and STB signals to indicate when a first burst terminates and when a second burst starts. These could be signalled separate from each other or in the same signal or message. The EOB indication can be implemented in various ways, e.g. in the form of a flag in a TCP header, IP header, TCP extension header or IP extension header, etc. Alternatively, the HTTP server 20 terminates the TCP connection when a burst has terminated. As to the STB indication, it may be included in the TCP or IP extension header or sent in a separate message, which is also true for the EOB, Thus, it may be necessary for the RNC 14 to perform Deep Packet Inspection (DPI) in order to derive the EOB and/or STB indications. With further reference to FIG. 6, in an embodiment of the present invention, the RNC 14 may request a particular silent time between consecutive bursts. In that case, that RNC 14 transmits such request(s) to the HTTP server 20 which manages the burst data such that the requested STB is provided.

Figure 7:
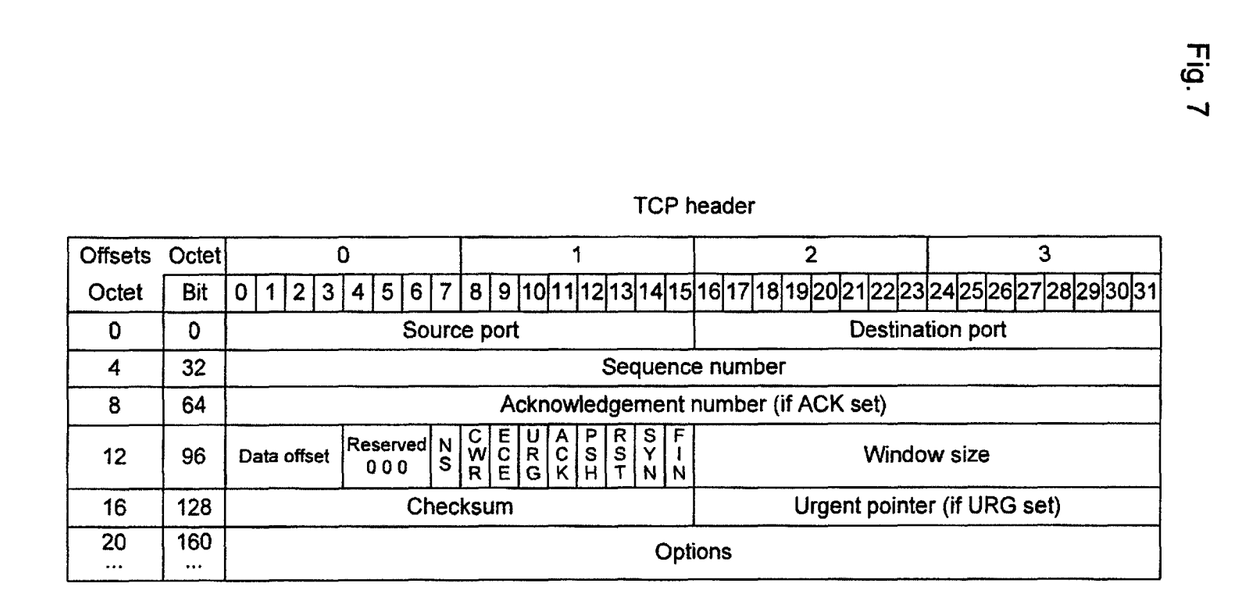
FIG. 7 shows an exemplifying TCP header conveying an EOB indication according to an embodiment of the present invention.

FIG. 7 illustrates an exemplifying TCP header conveying information pertaining EOB (and possibly STB) indication according to embodiments of the present invention. The TCP header will not be described in detail, but it can for example be seen that its first 32 bits carry information regarding source and destination port, while 16 bits starting at offset address 128 convey checksum data, and a field starting at offset address 160 could be used for optional purposes. Advantageously, this "Options" field could be arranged to comprise an EOB indicator, which in its simplest form is a "0" or "1" either of which could indicate an end-of-burst. Further, a numerical value could be included in the Option field, which value indicates the STB. An IP header could be arranged to convey EOB and STB indications accordingly.

Figure 8:
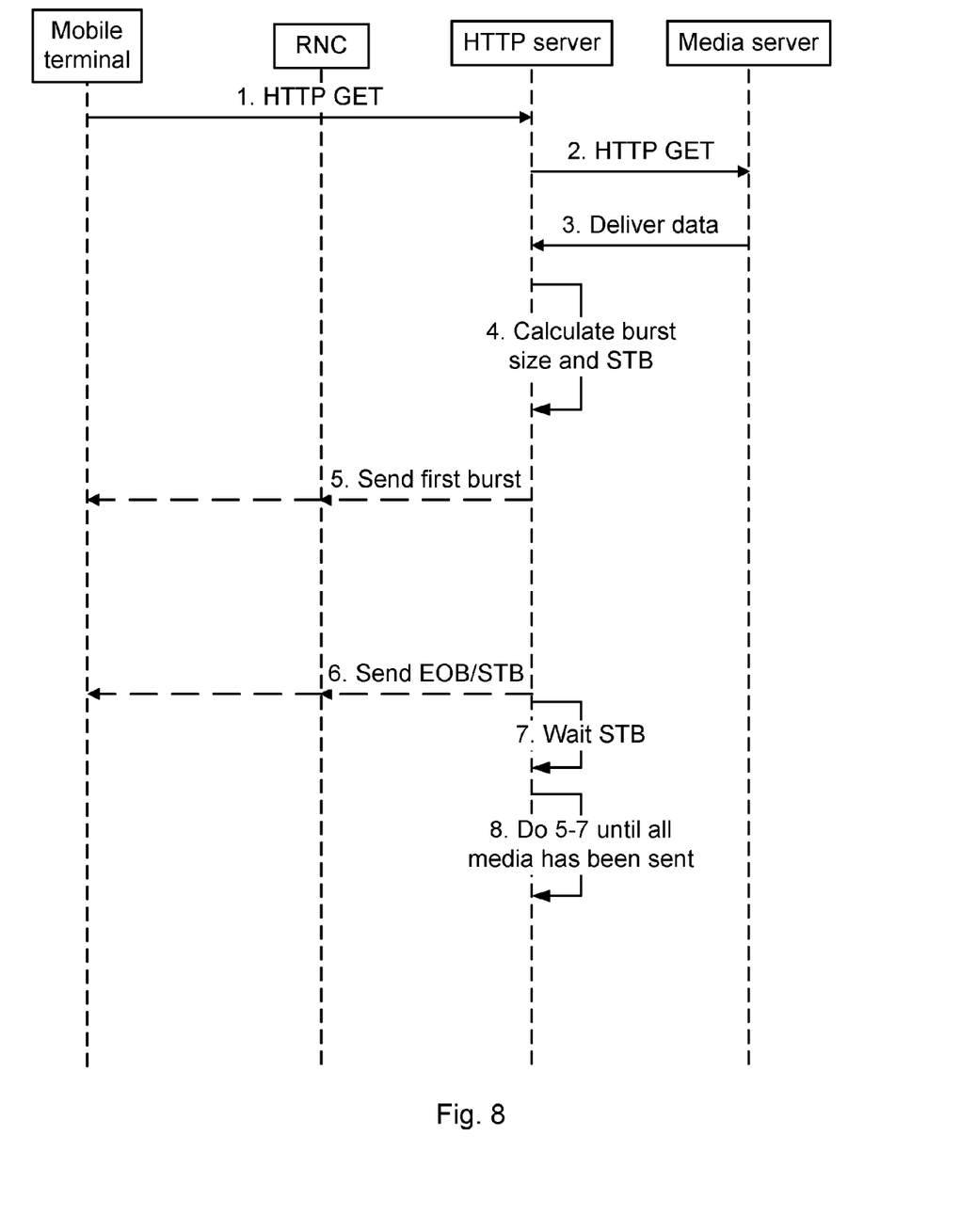
FIG. 8 illustrates an exemplifying sequence diagram for delivering data from a HTTP proxy to a mobile terminal according to embodiments of the present invention.

FIG. 8 illustrates an exemplifying sequence diagram for delivering data from a HTTP server to a mobile terminal according to embodiments of the present invention. The steps enumerated in FIG. 8 will be discussed in detail in the following.
1. A mobile terminal issues an HTTP GET, via the RNC, to the HTTP server. That is, the mobile terminal issues a request to the HTTP server to be provided with a particular set of data,
2. The HTTP server sends the request to the media server.
3. The media server returns the requested (non-burst) data. In practice, the non-burst data may be transferred in several separate streams.
4. The HTTP server receives the non-burst data and converts it to burst data. The HTTP server will determine appropriate burst size and silent time between consecutive bursts depending on data encoding rate.
5. Thereafter, the HTTP server transmits a TCP data burst to the mobile terminal via the RNC.
6. In order for the RNC to effectively control the communication state of the mobile terminal, the HTTP server supplies the RNC with an EOB and STB indication. Alternatively, this information could be supplied to the RNC along with the burst data in step 5. The RNC thus controls the mobile terminal to transit to an appropriate less resource consuming communication state of the plurality of communication states in response to the EOB and STB indications.
7. Subsequently, the HTTP server waits for an interval corresponding to STB before a next burst is sent, such that the RNC correspondingly can control the mobile terminal to transit to a higher resource consuming state of the plurality of communication states before the next burst is transmitted.
8. Steps 5-7 are repeated until all bursts have been transmitted to the mobile terminal.

It should be noted that HTTP server may convert non-burst data into burst data in such a manner that the silent time between consecutive bursts (STB) is the same for each transmitted burst. In that case, the RNC is supplied with the STB indication once. However, if the STB varies, the STB indications must repeatedly be provided to the RNC.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of controlling a mobile terminal in a radio access network (RAN), the method performed by a first device that controls the RAN and comprising:
    the first device receiving, from a second device, burst data intended for the mobile terminal;
    the first device forwarding to the mobile terminal the received burst data, wherein the mobile terminal is in a first communication state;
    the first device detecting the onset of a silent interval during which the second device does not transmit additional burst data intended for the mobile terminal, wherein detecting the onset of the silent interval comprises the first device receiving, from the second device, an explicit indicator expressly indicating the onset of the silent interval during which the second device does not transmit additional burst data intended for the mobile terminal; and
    the first device controlling the mobile terminal to transition from the first communication state to a second communication state after first device receives the explicit indicator transmitted by the second device, wherein the second communication state is less resource consuming than the first communication state.

2. The method of claim 1, further comprising:
    the first device obtaining information identifying the length of the silent interval; and
    the first device determining whether the length of the silent interval exceeds a threshold, wherein
    the first device controls the mobile terminal to transition from the first communication state to a second communication state as a result of detecting the onset of the silent interval and determining that the length of the silent interval exceeds the threshold.

3. The method of claim 1, wherein receiving the burst data comprises receiving at least one protocol data unit (PDU) that includes at least a portion of the burst data.

4. The method of claim 2, wherein obtaining the information identifying the length of the silent interval comprises receiving the information from the second device.

5. The method of claim 3, wherein the PDU includes the explicit indicator expressly indicating the onset of the silent interval.

6. The method of claim 1, wherein the explicit indicator comprises one of: a Transmission Control Protocol (TCP) session termination indication and an Internet Protocol (IP) session termination indication.

7. The method of claim 5, wherein the explicit indicator consists of a single bit located in a header of the PDU.

8. A computer program product comprising a non-transitory computer readable medium having computer-executable instructions which, when executed by a processing unit, causes the processing unit to perform the method of claim 1.

9. The method of claim 1, wherein the first device is a radio network controller (RNC), and the second device is a proxy server.

10. The method of claim 1, wherein the step of the first device controlling the mobile terminal to transition to a less resource consuming communication state occurs before an inactivity timer which is used for transitioning between radio resource control (RRC) states expires.

11. A method performed by a second device, the method comprising:
the second device obtaining non-burst data;
the second device buffering the non-burst data; and
the second device using data bursts to transmit the non-burst data to the mobile terminal, wherein using data bursts to transmit the non-burst data to the mobile terminal comprises:
the second device transmitting a first portion of the non-burst data to the mobile terminal, wherein a first device is configured to receive the first portion of the non-burst data transmitted by the second device and forward the received first portion of the non-burst data to the mobile terminal and the first device is further configured to control the mobile terminal to transition from a first communication state to a second communication state;
after transmitting at least some of the first portion of the non-burst data to the mobile terminal and prior to transmitting a second portion of the non-burst data to the mobile terminal, the second device transmitting end-of-burst (EOB) information comprising an EOB indicator expressly indicating the onset of a silent interval, wherein during the silent interval the second device does not transmit to the mobile terminal any portion of the non-burst data;
the second device detecting that the silent interval has elapsed; and
the second device transmitting to the mobile terminal the second portion of the non-burst data in response to detecting that the silent interval has elapsed.

12. The method of claim 11, wherein the EOB information further comprises information identifying the length of the silent interval.

13. The method of claim 11, wherein
transmitting the first portion of the non-burst data comprises: transmitting a first protocol data unit (PDU) comprising one part of the first portion of the non-burst data and transmitting a second PDU comprising another part of the first portion of the non-burst data, and
the second PDU further comprises the EOB information.

14. The method of claim 11, further comprising:
transmitting, to the first device information identifying the length of the silent interval.

15. The method of claim 11, further comprising:
receiving, from the first device, a request comprising information identifying the length of the silent interval.

16. A computer program product comprising a non-transitory computer readable medium having computer-executable instructions which, when executed by a processing unit, causes the processing unit to perform the method of claim 11.

17. A first device for controlling a mobile terminal in a radio access network to transition between a plurality of communication states, wherein the first device comprises a processing unit being arranged to:
receive, from a second device, burst data intended for the mobile terminal;
forward to the mobile terminal the received burst data while the mobile terminal is in a first communication state;
detect the onset of a silent interval during which the second device does not transmit additional burst data intended for the mobile terminal by receiving, from the second device, an explicit indicator expressly indicating the onset of the silent interval during which the second device does not transmit additional burst data intended for the mobile terminal; and
control the mobile terminal to transition from the first communication state to a second communication state as a result of the first device receiving the indicator transmitted by the second device, wherein the second communication state is less resource consuming than the first communication state.

18. The first device of claim 17, wherein the first device is further arranged to:
obtain information identifying the length of the silent interval; and
determine whether the length of the silent interval exceeds a threshold, wherein
the first device is configured such that the first device controls the mobile terminal to transition from the first communication state to a second communication state as a result of detecting the onset of the silent interval and determining that the length of the silent interval exceeds the threshold.

19. The first device of claim 18, wherein the processing unit is arranged to obtain the information identifying the length of the silent interval by receiving the information from the second device.

20. The first device of claim 17, wherein the first device is operable to receive the burst data by receiving at least one protocol data unit (PDU) that includes at least a portion of the burst data.

21. The first device of claim 20, wherein the PDU includes the explicit indicator expressly indicating the onset of the silent interval.

22. The first device of claim 17, wherein the explicit indicator comprises one of: a Transmission Control Protocol (TCP) session termination indication and an Internet Protocol (IP) session termination indication.

23. A second device for converting non-burst data into burst data, wherein the second device comprises a processing unit being arranged to:
obtain non-burst data;
buffer the non-burst data; and
use data bursts to transmit the non-burst data to the mobile terminal, wherein the processing device is configured to use data bursts to transmit the non-burst data to the mobile terminal by performing a process comprising:
transmitting a first portion of the non-burst data to the mobile terminal, wherein a first device is configured to receive the first portion of the non-burst data transmitted by and forward the received first portion of the non-burst data to the mobile terminal and the first device is further configured to control the mobile terminal to transition from a first communication state to a second communication state;
after transmitting at least some of the first portion of the non-burst data to the mobile terminal and prior to transmitting a second portion of the non-burst data to the mobile terminal, the second device transmitting end-of-burst (EOB) information comprising an EOB indicator expressly indicating the onset of a silent interval, wherein during the silent interval the second device does not transmit to the mobile terminal any portion of the non-burst data;

detecting that the silent interval has elapsed; and transmitting to the mobile terminal the second portion of the non-burst data in response to detecting that the silent interval has elapsed.

24. The second device of claim 23, wherein the EOB information further comprises information identifying the length of the silent interval.

25. The second device of claim 23, wherein the second device is configured to transmit the first portion of the non-burst data by performing a process comprising: transmitting a first protocol data unit (PDU) comprising one part of the first portion of the non-burst data and transmitting a second PDU comprising another part of the first portion of the non-burst data, and the second PDU further comprises the EOB information.

26. The second device of claim 23, the processing unit further being arranged to:

transmit to the first device information identifying the length of the silent interval.

27. The second device of claim 23, the processing unit further being arranged to:

receive, from the first device, a request comprising information identifying the length of the silent interval.

* * * * *

UNITED STATES PATENT AND TRADEMARK OFFICE
CERTIFICATE OF CORRECTION

PATENT NO. : 9,788,193 B2  
APPLICATION NO. : 13/701672  
DATED : October 10, 2017  
INVENTOR(S) : Skog et al.

Page 1 of 1

It is certified that error appears in the above-identified patent and that said Letters Patent is hereby corrected as shown below:

On the Title Page

In Item (75), under "Inventors", in Column 1, Line 1, delete "Hasselby" and insert -- Hässelby --, therefor.

In the Specification

In Column 1, Line 45, delete "network," and insert -- network. --, therefor.

In Column 4, Line 39, delete "server," and insert -- server. --, therefor.

In Column 9, Line 18, delete "EOB," and insert -- EOB. --, therefor.

In Column 9, Line 49, delete "data," and insert -- data. --, therefor.

Signed and Sealed this  
Twenty-second Day of May, 2018

Andrei Iancu  
*Director of the United States Patent and Trademark Office*